US012447951B2

(12) United States Patent
Maulimov et al.

(10) Patent No.: US 12,447,951 B2
(45) Date of Patent: Oct. 21, 2025

(54) TRAFFIC OBJECT INTENT ESTIMATION (71) Applicant: TORC Robotics, Inc., Blacksburg, VA (US)

(72) Inventors: Mukhtar Maulimov, Blacksburg, VA (US); Thomas Stevens, Portland, OR (US); Thomas Maslach, Canton, MI (US)

(73) Assignee: TORC Robotics, Inc., Blacksburg, VA (US)

( * ) Notice: Subject to any disclaimer, the term of this patent is extended or adjusted under 35 U.S.C. 154(b) by 210 days.

(21) Appl. No.: 18/312,485

(22) Filed: May 4, 2023

(65) Prior Publication Data
US 2024/0367646 A1  Nov. 7, 2024

(51) Int. Cl.
*B60W 30/09* (2012.01)
*B60W 30/095* (2012.01)
*B60W 30/14* (2006.01)
*B60W 30/18* (2012.01)
*B60W 50/00* (2006.01)
*B60W 60/00* (2020.01)

(52) U.S. Cl.
CPC ........ *B60W 30/09* (2013.01); *B60W 30/0956* (2013.01); *B60W 30/146* (2013.01); *B60W 30/18163* (2013.01); *B60W 50/0097* (2013.01); *B60W 60/0015* (2020.02); *B60W 60/00274* (2020.02); *B60W 2300/145* (2013.01); *B60W 2552/53* (2020.02); *B60W 2554/4041* (2020.02); *B60W 2554/4045* (2020.02); *B60W 2554/80* (2020.02)

(58) Field of Classification Search
CPC ............ B60W 30/09; B60W 30/0956; B60W 60/00274; B60W 2554/4041; B60W 2554/80; B60W 30/085; B60W 60/0027; B60W 2554/4043
See application file for complete search history.

(56) References Cited

U.S. PATENT DOCUMENTS

| 8,630,762 | B2 | 1/2014 | Staempfle et al. | |
| 11,420,630 | B2* | 8/2022 | Dax | G08G 1/166 |
| 11,794,776 | B2 | 10/2023 | Larsson | |
| 11,897,461 | B2 | 2/2024 | Hukkeri et al. | |
| 2016/0347310 | A1* | 12/2016 | Moran | B60W 30/09 |
| 2020/0150653 | A1* | 5/2020 | Goldman | H04W 4/024 |

(Continued)

OTHER PUBLICATIONS

International Search Report and Written Opinion dated Aug. 7, 2024 for International Patent Application No. PCT/US2024/025670.

*Primary Examiner* — Peter D Nolan
*Assistant Examiner* — Anwar Mohamed
(74) *Attorney, Agent, or Firm* — Armstrong Teasdale LLP (57) ABSTRACT

A method comprises periodically monitoring, by a processor, lateral position and velocity of vehicle within a predetermined distance from an autonomous vehicle, the vehicle moving in a direction having at least one common attribute with the autonomous vehicle; executing, by the processor, a computer model using the monitored lateral position and velocity of the vehicle, to predict whether a trajectory for the vehicle; and when a current trajectory of the autonomous has a likelihood of collision with the predicted trajectory of the vehicle that satisfies a threshold, determining, by the processor, an alternative trajectory for the autonomous vehicle.

16 Claims, 6 Drawing Sheets

(56) References Cited

U.S. PATENT DOCUMENTS

2021/0107476 A1\* 4/2021 Cui ................ B60W 60/00276
2022/0324482 A1 10/2022 Guo et al.
2023/0373476 A1 11/2023 Ho

\* cited by examiner

TRAFFIC OBJECT INTENT ESTIMATION

TECHNICAL FIELD

The present disclosure relates generally to autonomous vehicles and, more specifically, to systems and methods for autonomous vehicle operation.

BACKGROUND

The use of autonomous vehicles has become increasingly prevalent in recent years, with the potential for numerous benefits, such as improved safety, reduced traffic congestion, and increased mobility for people with disabilities. However, with the deployment of autonomous vehicles on public roads, there is a growing concern about interactions between autonomous vehicles and negligent actors (whether human drivers or other autonomous systems) operating other vehicles on the road.

An example of an interaction between an autonomous vehicle and other drivers on the road may be lane changes where the autonomous vehicle must determine whether another vehicle is attempting to change its lane (sometimes unsafely) and correct its own trajectory accordingly. Therefore, identifying and reacting to the longitudinal distance between autonomous vehicles and surrounding vehicles poses a significant challenge. One particular issue is accurately predicting when an actor in an adjacent lane intends to change its lane of travel. This preemption of an object's intent is crucial for improving comfort and safety, and creating a more natural driving experience. However, the uncertainty, data noise, and limitations of perception make this a complex task that can lead to inappropriate actions taken by the autonomous vehicle. For instance, without proper consideration and projection of an object's intent, autonomous vehicles can exhibit unnatural and uncomfortable driving maneuvers, similar to those performed by robots, instead of the more intuitive, human-like behavior that is expected of autonomous vehicles.

SUMMARY

The systems and methods of the present disclosure may solve the problems set forth above and/or other problems in the art. Using the methods and systems discussed herein, an autonomous vehicle may correctly and efficiently determine the intent of other vehicles with respect to entering and exiting lanes of travel. Using the methods and systems discussed herein a processor may analyze the position history of each object surrounding the autonomous vehicle in order to estimate its lateral velocity and project its future lateral positions in order to assess whether the object intends to "cut" into (enter) or exit the autonomous vehicle's lane.

In one embodiment, a method comprises periodically monitoring, by a processor, lateral position and velocity of a vehicle within a predetermined distance from a lane line representing a boundary of a lane of an autonomous vehicle, the vehicle is moving in a same direction as the autonomous vehicle; executing, by the processor, a computer model using the monitored lateral position and velocity of the vehicle, to predict whether a predicted trajectory for the vehicle has a likelihood of collision with the autonomous vehicle within a time threshold; and in response to the vehicle having a threshold distance from the lane line and in response to a current trajectory of the autonomous vehicle having the likelihood of imminent collision with the predicted trajectory of the vehicle satisfying a threshold, determining, by the processor, an alternative trajectory for the autonomous vehicle.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
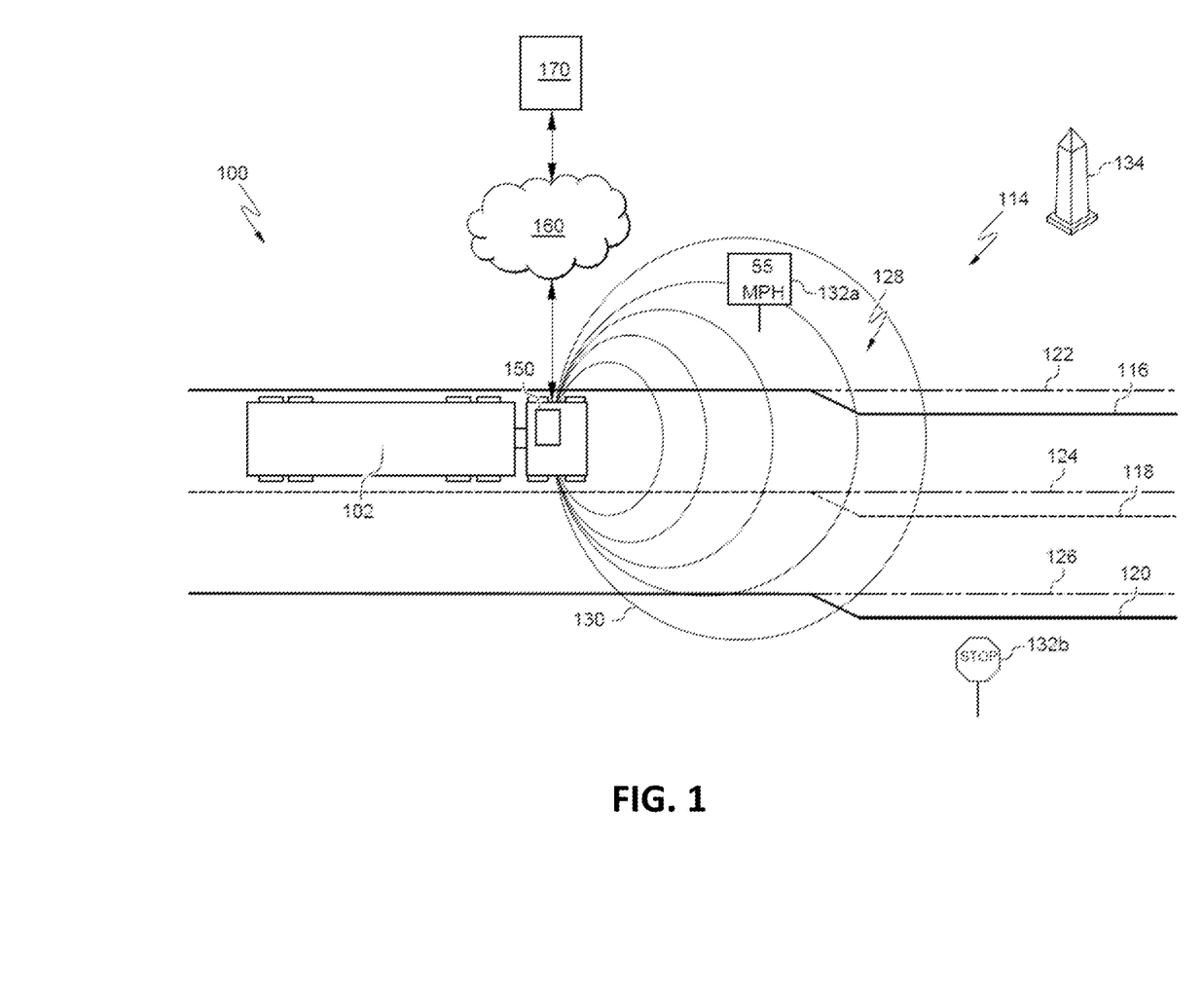
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
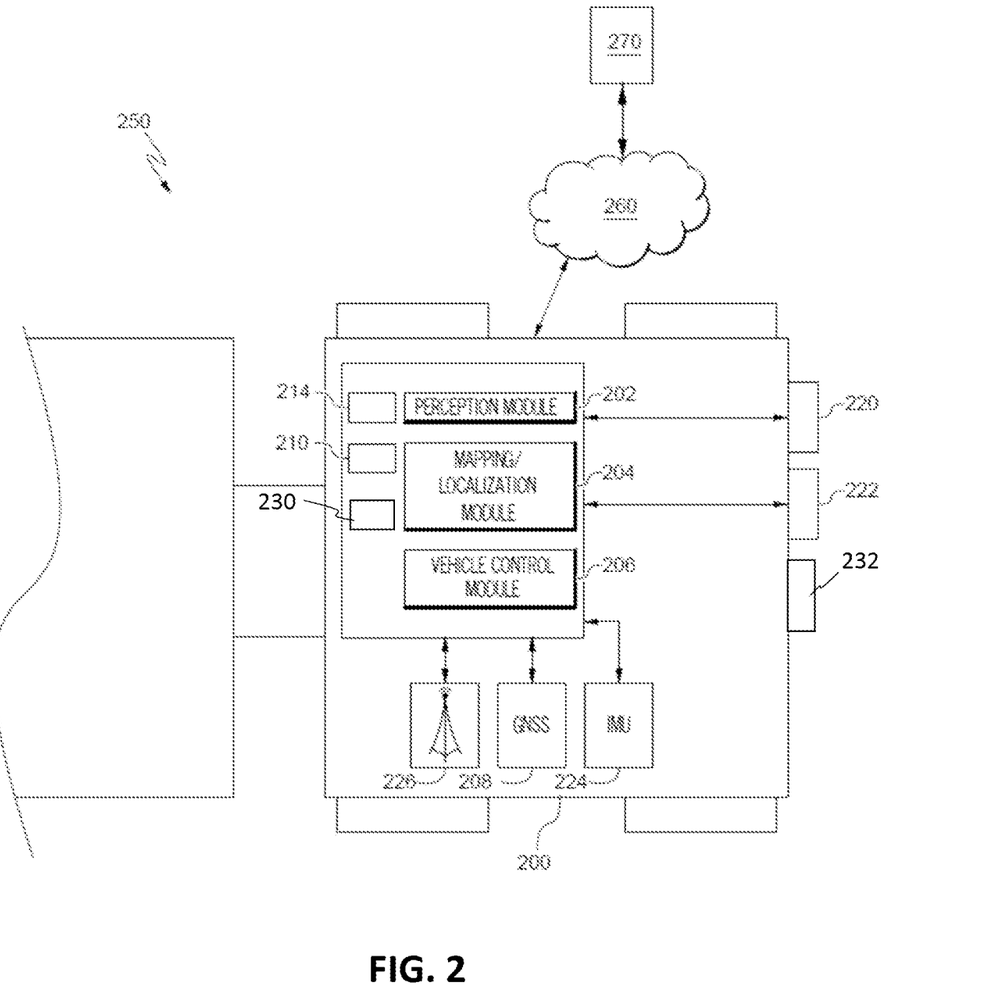
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field-of-view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared (IR) light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer, or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the autonomy system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 260. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 260. Various other known circuits may be associated with the autonomy system 250, including signal-conditioning circuitry, communication circuitry, actuation circuitry, and other appropriate circuitry.

Figure 5:
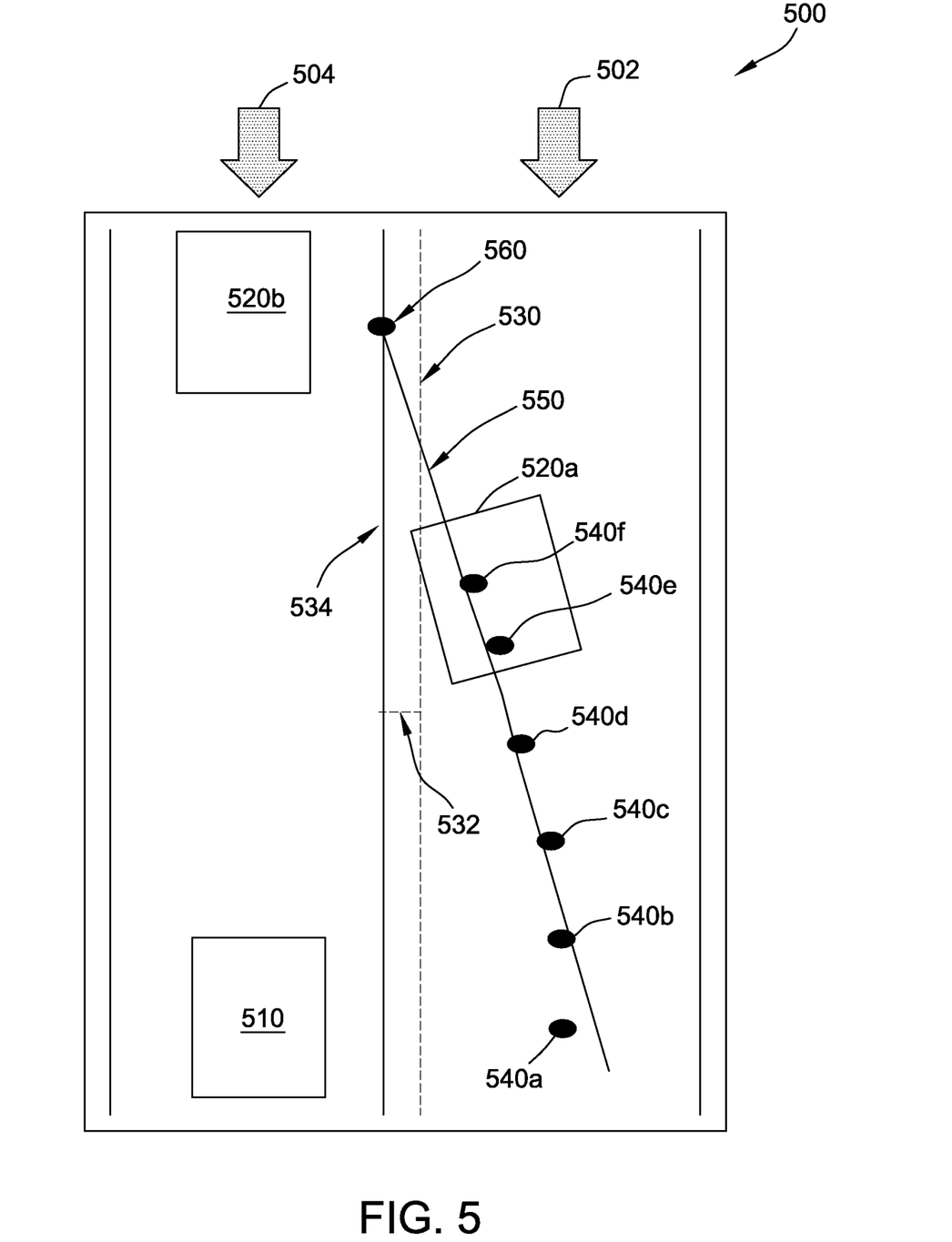
FIGS. 5-6 depict bird's-eye views of roadway scenarios including schematic representatives of an autonomous vehicle and various target objects in a region of collision proximity to the autonomous vehicle, according to an embodiment.
Figure 6:
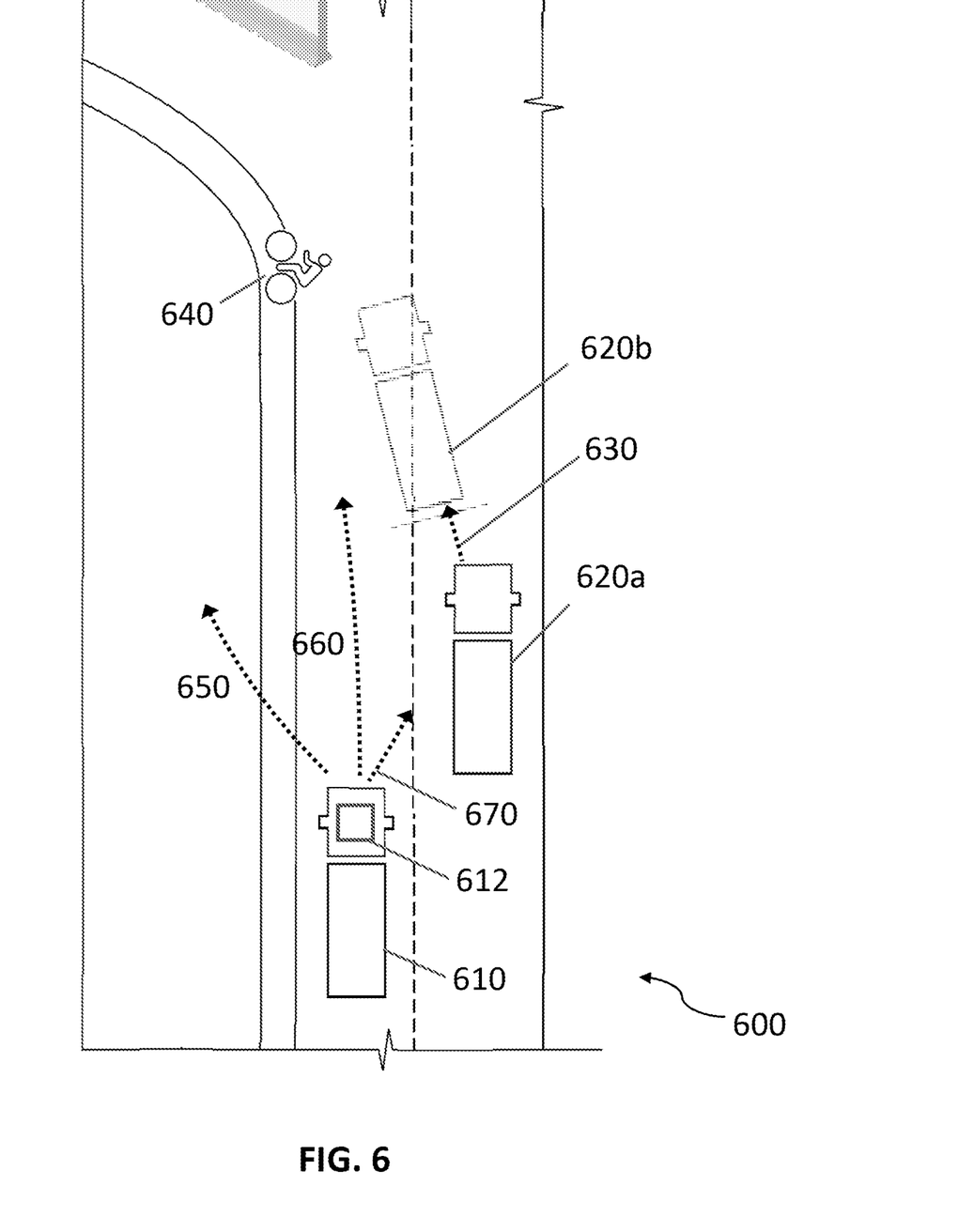

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the method 500 described herein with respect to FIG. 5, and the method 600 described herein with respect to FIG. 6. Further, the memory 214 may also store data received from various inputs associated with the autonomy system 250, such as data from the perception system.

As noted above, perception module 202 may receive input from the various sensors, such as camera system 220, LiDAR system 222, GNSS receiver 208, and/or IMU 224 (collectively "perception data") to sense an environment surrounding the truck 260 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines 116, 118, 120 that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.) that may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) the truck 200 may use the vehicle control module 206 and its associated systems to plan and execute maneuvers and/or routes with respect to the features of the environment. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.) The vehicle control module 206 may be configured to avoid obstacles in the environment surrounding the truck 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In disclosed embodiments of a system for planning paths that will minimize the severity of a collision, the system 100, 250 collects perception data on objects that satisfy predetermined criteria for likelihood of collision with the ego vehicle. Such objects are sometimes referred to herein as target objects. Collected perception data on target objects may be used in collision analysis.

In an embodiment, collision analysis module 230 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 3:
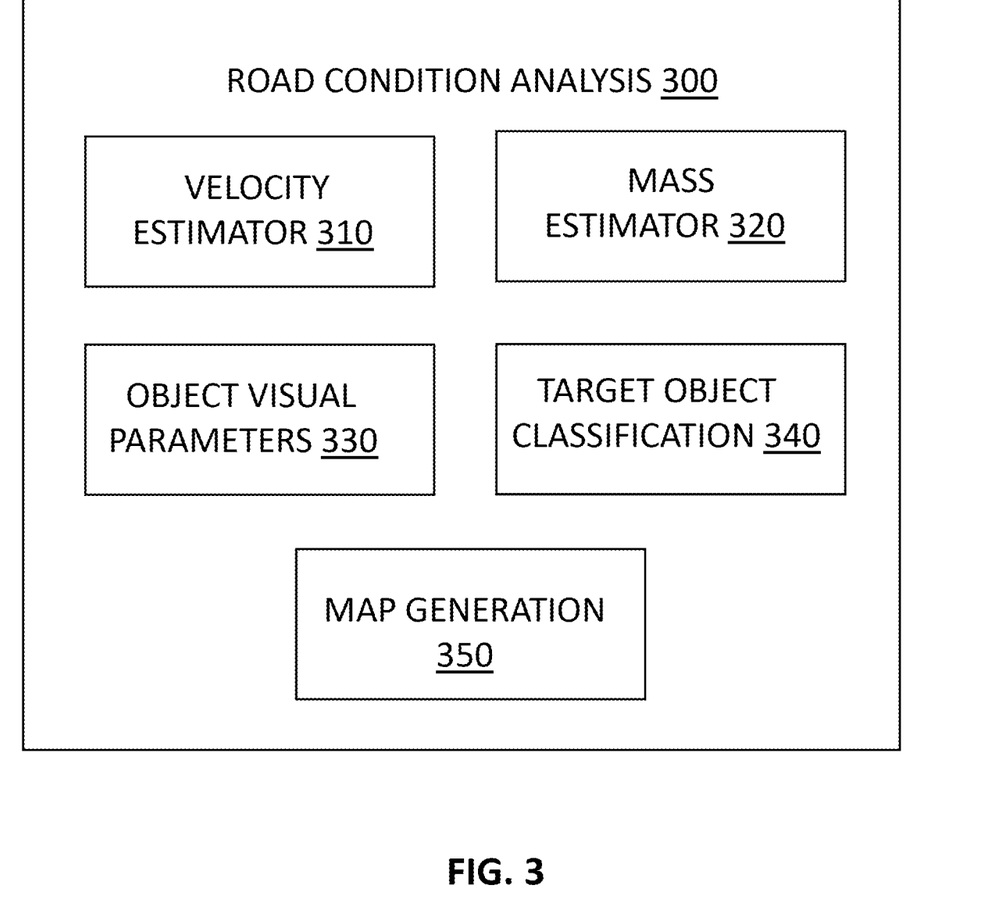
FIG. 3 is a schematic diagram of a collision analysis module of the autonomy system of the vehicle, according to an embodiment.

FIG. 3 shows a road condition analysis module 300 of system 100, 250. The road condition analysis module 300 includes velocity estimator 310, effective mass estimator 320, object visual parameters component 330, and target object classification component 340. These components of road condition analysis module 300 may be either or both software-based components and hardware-based components.

Velocity estimator 310 may determine the relative velocity of target objects relative to the ego vehicle. Effective mass estimator 320 may estimate effective mass of target objects, e.g., based on object visual parameters signals from object visual parameters component 330 and object classification signals from target object classification component 340. Object visual parameters component 330 may determine visual parameters of a target object such as size, shape, visual cues and other visual features in response to visual sensor signals, and generates an object visual parameters signal. Target object classification component 340 may determine a classification of a target object using information contained within the object visual parameters signal, which may be correlated to various objects, and generates an object classification signal. For instance, the target object classification component 340 can determine whether the target object is a plastic traffic cone or an animal.

Target objects may include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily static objects such as parked cars. Systems and methods herein may aim to choose a collision path that may involve a surrounding inanimate object. The systems and methods aim to avoid a vulnerable pedestrian, bicyclist, motorcycle, or other targets involving people or animate beings, and this avoidance is a priority over a collision with an inanimate object.

Externally-facing sensors may provide system 150, 250 with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 150, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Using the data collected, a map generation module 350 may generate a high-definition (HD) map used by the autonomous vehicle to navigate. The map generation module 350 may generate an HD map by utilizing various data sources and advanced algorithms. The data sources may include information from onboard sensors, such as cameras, LiDAR, and radar, as well as data from external sources, such as satellite imagery and information from other vehicles. The map generation module 350 may collect and process the data from these various sources to create a high-precision representation of the road network. The map generation module 350 may use computer vision techniques, such as structure from motion, to process the data from onboard sensors and create a 3D model of the environment. This model may then be combined with the data from external sources to create a comprehensive view of the road network.

The map generation module 350 may also apply advanced algorithms to the data, such as machine learning and probabilistic methods, to improve the detail of the road network map. The algorithms may identify features such as lane markings, road signs, traffic lights, and other landmarks, and label them accordingly. The resulting map may then be stored in a format that can be easily accessed and used by the autonomous vehicle.

The map generation module 350 may use real-time updates from the vehicle's onboard sensors to continuously update the HD map as the vehicle moves. This enables the vehicle to maintain an up-to-date representation of its surroundings and respond to changing conditions in real-time.

The ability to generate an HD map may allow for safe and efficient operation of autonomous vehicles, as the map provides a detailed, up-to-date representation of the road network that the vehicle can use to navigate and make real-time decisions.

Using the methods and systems discussed herein, a processor of the autonomous vehicle may generate an HD map, revise the HD map using various data (e.g., from identified road signs or received from a server), and/or display the map for a human driver.

Figure 4:
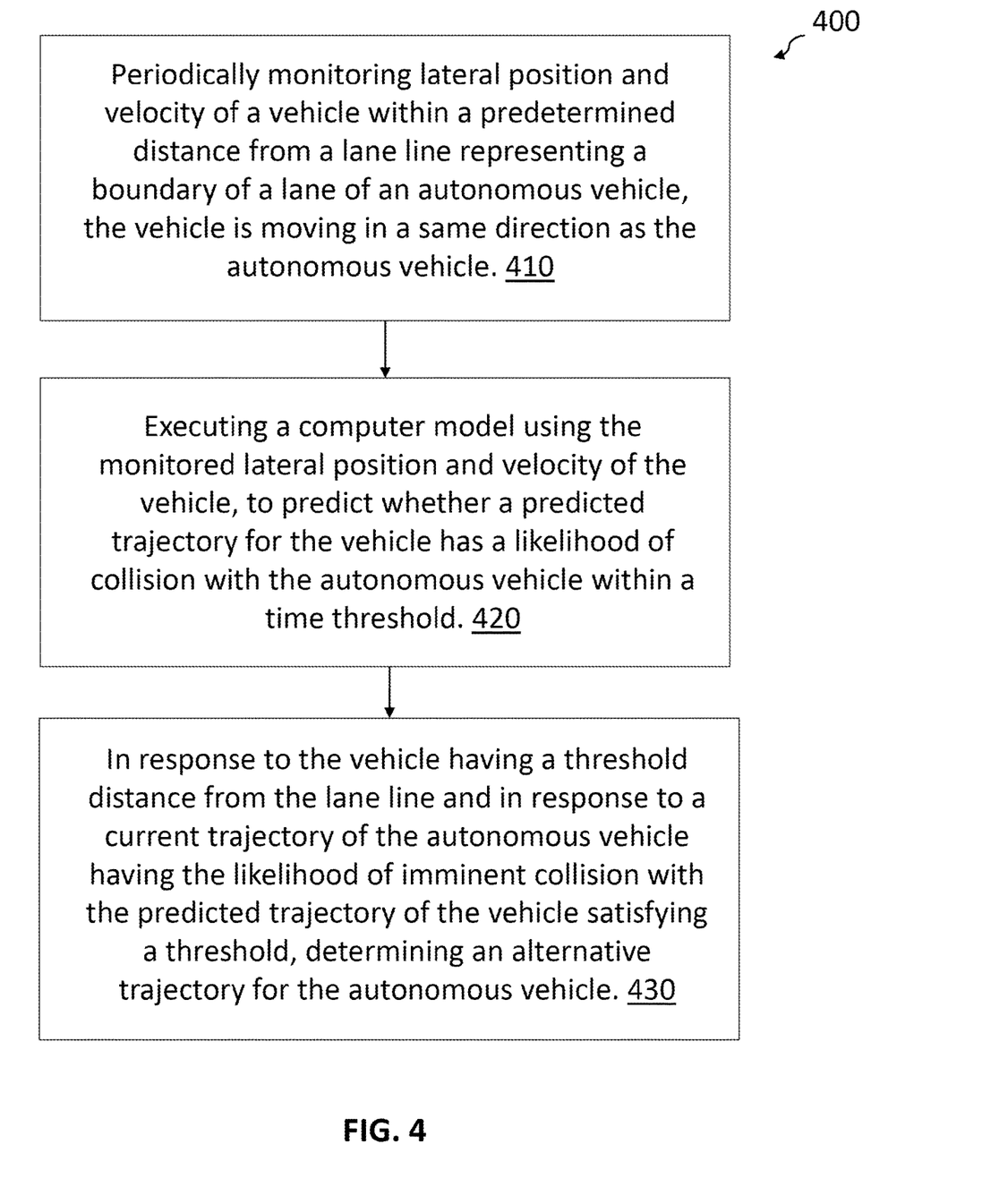
FIG. 4 is a method of navigating of an autonomous vehicle, according to an embodiment.

FIG. 4 shows execution steps of a processor-based method using the system 100, 250, and 300 according to some embodiments. The method 400 shown in FIG. 4 comprises execution steps 410-430. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 4 is described as being performed by a processor, such as the processor 210 depicted in FIG. 2. However, in some embodiments, one or more of the steps may be performed by a different processor, server, or any other computing feature. For instance, one or more of the steps may be performed via a cloud-based service or another processor in communication with the processor of the autonomous vehicle and/or its autonomy system. Although the steps are shown in FIG. 4 having a particular order, it is intended that the steps may be performed in any order. It is also intended that some of these steps may be optional.

Using the method 400, the processor may determine a likelihood of a collision with a target object that is intending to change its lane into a lane occupied by the autonomous vehicle. The method 400 applies to any object detected by the processor, such as other vehicles being driven (whether autonomously or by human drivers). The present disclosure discusses the method of 400 with respect to other vehicles and refers to the target objects as vehicles. However, the method 400 is not limited to vehicles. The intent may be calculated using a computer model that can be executed locally (within the autonomous vehicle) and/or remotely. For instance, the processor of the autonomous vehicle may transmit data collected by various sensors to a model that is implemented in the cloud. The model may then indicate a predicted intent for the vehicle nearby. Based on the response received from the model, the processor may take an action. For instance, when the likelihood of collision is high, the processor identifies alternative trajectories for the autonomous vehicle. That is, at least one attribute of the trajectory of the autonomous vehicle may be revised, thereby avoiding a potential collision.

In an embodiment of step 410, the processor may periodically monitor lateral position and velocity of a vehicle within a predetermined distance from a lane line representing a boundary of a lane of an autonomous vehicle, the vehicle is moving in a same direction as the autonomous vehicle. In some embodiments, using various data received from the sensors of the autonomous vehicle, the processor may determine whether the vehicle (or target object) is within a margin (buffer distance) away from the autonomous vehicle.

Using various sensors of the autonomous vehicle, the processor may detect a plurality of vehicles in proximity to the autonomous vehicle. When the processor identifies multiple vehicles, the processor may only implement the method 400 on vehicles that are within a certain distance threshold from the autonomous vehicle, such as within 20 feet (or any other threshold identified by a system administrator or owner of the autonomous vehicle). In this way, the processor may only analyze data associated with vehicles that are traveling nearby and have a higher chance of collision. For instance, another vehicle traveling two lanes away from the autonomous vehicle may be excluded because that vehicle has a very low likelihood of changing two lanes at a time. However, if the same vehicle changes its lane and is now driving in an adjacent lane to the autonomous vehicle, the processor may include the vehicle (based on the vehicle being within the predetermined distance threshold). By limiting the computing power to vehicles nearby, the processor may ensure that it allocates its resources to fewer vehicles, thereby allowing itself to identify results in a faster manner and using less computing power. In another embodiment, the processor may monitor vehicles in all lanes traveling in the same direction as the autonomous vehicle.

In some embodiments, the processor may also filter the vehicles based on attributes of their motion. For instance, the processor may only allocate its resources on vehicles moving in a direction having at least one common attribute with the autonomous vehicle. For instance, the processor may focus on vehicles that are traveling in the same direction as the autonomous vehicle, thereby excluding oncoming traffic.

In another example, the processor may filter the vehicles based on their vertical position. For instance, the processor may only consider vehicles that are in front of the autonomous vehicle.

Via various sensors of the autonomous vehicle, the processor may periodically (e.g., every half-second, every second, or any other frequency of data retrieval indicated by a system administrator or an owner of the autonomous vehicle) capture the lateral position and velocity of the vehicle. The processor may use a combination of data received via different sensors, such as cameras, LiDAR, and radar, to detect attributes of the way the vehicle is being driven, such as its velocity and lateral position.

At step 420, the processor may execute a computer model using the monitored lateral position and velocity of the vehicle, to predict whether a predicted trajectory for the vehicle has a likelihood of collision with the autonomous vehicle within a time threshold. After capturing the lateral position and velocity of the vehicle, the processor may use a computer model to predict a trajectory for the vehicle. Specifically, the processor may predict whether the vehicle is going to change lanes and whether the vehicle has a trajectory/path that interferes with the autonomous vehicle. For instance, the computer model may indicate whether the vehicle is going to "cut" into or exit the lane in which the autonomous vehicle is traveling.

The computer model may generate a predicted path for the vehicle using its previously-monitored lateral position and velocity. As discussed herein, various sensors of the autonomous vehicle may periodically collect lateral position and velocity of other vehicles on the road. Using these monitored lateral positions, the computer model may use various methods (e.g., machine learning and/or linear or non-linear regression) to predict a path and velocity for the vehicle. For instance, the computer model may use various methods to fit a line (a predicted path of travel) in accordance with the monitored data points (e.g., lateral positions of the vehicle).

The model may actively deduce various data points as outliers. In this way, the computer model may eliminate lateral oscillations of vehicles within their own lanes caused by unsteady driving.

The model may also predict a velocity for the vehicle. In some embodiments, the model may assume that the velocity will stay the same. Additionally or alternatively, the model may predict a future velocity based on the monitored velocity. For instance, the model may determine a trajectory for the velocity and interpolate a future value for it.

Using the predicted path and velocity, the computer model may predict a position for the vehicle. For instance, a slope of the predicted path can be considered as the lateral velocity of the vehicle. Using the velocity, the computer model may determine a timing of the predicted intent. For instance, as depicted in FIG. 5, the computer model may predict where and when another vehicle is to be entering the adjacent lane.

The computer model may define each vehicles and hold two binary Bayes filters: one for their intent to exit the lane of the autonomous vehicle, and one for their intent to enter the lane. These filters may be updated based on the projection of when a vehicle will cross into the lane, the vehicle's estimated lateral velocity, and the autonomous vehicle's time-to-collision with vehicle(s) ahead. If the vehicle does not have any appreciable lateral velocity, its filters are updated accordingly with values representing no intent. Otherwise, the vehicle's respective intents (to enter or exit the lane) may be updated with probabilities based on comparison to some threshold of the estimated time to cross into or out of the lane.

In some embodiments, if there is not sufficient position history of a vehicle, then the vehicle may not be considered to have any intent (either entering or exiting) and its filters may be cleared. In some embodiments, a processor may use a constant lateral velocity model where a line (path of travel) is fit to the history of the lateral offset of the vehicle with respect to the lane. The slope of this line may represent an estimate of the vehicle's lateral velocity and be used to project by some threshold when the vehicle will cross into the lane.

In some embodiments, if the vehicle has an appreciable lateral velocity (e.g., more than a certain threshold identified in absolute value or percentage) towards the edge of the autonomous vehicle's lane), the computer model may assume that the vehicle may have the intent to "cut" into the lane. Similarly, if the vehicle has an appreciable lateral velocity away from the autonomous vehicle's lane, then the computer model may assume that the vehicle may have intent to exit the lane. If the vehicle is already sufficiently within the lane or sufficiently outside of the lane, then computer model may assume that the vehicle has no intent (to either enter or exit).

In some embodiments, the processor may consider a time of predicted collision. For instance, in addition to determining that the predicted trajectory for the vehicle and the autonomous vehicle, the processor may use each vehicle's velocity to predict a time of collision. In some embodiments, the processor may only move to the next step of the method 400 (e.g., step 430) if the predicted time of collision satisfies a threshold. For instance, the processor may only execute the step 430, if the predicted path of the vehicle and the autonomous vehicle collide within a second. The threshold may be revised by a system administrator, such that the autonomous vehicle becomes more sensitive to other vehicles on the road. For instance, if the threshold is raised to 3 seconds, the autonomous vehicle is less proactive to other vehicles possibly changing lanes.

In an embodiment of step 430, in response to the vehicle having a threshold distance from the lane line and in response to a current trajectory of the autonomous vehicle having the likelihood of imminent collision with the predicted trajectory of the vehicle satisfying a threshold, determining an alternative trajectory for the autonomous vehicle.

Using the predicted trajectory/path of the nearby vehicles, the processor may determine if a collision is imminent (within a predetermined time window). Specifically, the processor may predict a likelihood of collision and if the likelihood satisfies a threshold (e.g., 50% or 80% chance of collision), the processor may proceed with identifying an alternative trajectory for the autonomous vehicle. The threshold may be set by a system administrator and/or an owner of the autonomous vehicle. The threshold may correspond to how sensitive the autonomous vehicle will be to other vehicles nearby. For instance, a lower threshold may mean that the autonomous vehicle will be more sensitive (e.g., will change its trajectory easier). The threshold may be revised in accordance with various factors and preferences.

In some embodiments, the processor may only determine/implement the alternative trajectory if the likely collision is within a time threshold, such as one second, two seconds, or any other time threshold indicated by a system administrator. In this way, the processor may ensure that the autonomous vehicle is only reacting to imminent and very likely predicted collisions. Additionally or alternatively, the processor may utilize a velocity threshold.

If the processor determines that a collision is likely and/within the time threshold, it will identify and implement an alternative trajectory for the autonomous vehicle. As used herein, an alternative trajectory may refer to any evasive action that can allow the autonomous vehicle to avoid the collision and/or warn the other vehicle.

In some embodiments, the alternative trajectory may refer to warning other vehicles. For instance, the processor may enable a lighting apparatus of the autonomous vehicle to emit different light, such as blinking or high beam light to warn the other vehicle's driver. The duration for which the lighting apparatus is used to warn the other vehicle may depend on various factors, such as a distance between the autonomous car and the other vehicle, lateral position of the vehicle, speeds of the autonomous vehicle and the other vehicle, and the like. The processor may optionally only execute this option at night or when a light-sensing sensor of the autonomous vehicle determines that the light exposure is less than a certain threshold (e.g., indicating that the autonomous vehicle is driving in the dark).

In some embodiments, the autonomous vehicle may include a light filter (e.g., colored filter, such as red filtering) that can be implemented, such that the light emitted from the autonomous vehicle is filtered. In this way, the headlights may not be entirely disabled. Instead, the headlight will emit light that is in a different color, e.g., red light, to warn the other vehicle.

In some embodiments, the processor may enable a sound-generating device associated with the autonomous vehicle. For instance, the processor may instruct a horn to output a loud noise for a duration of time, such as for a second, two seconds, or five seconds.

In some embodiments, the processor may instruct the autonomous vehicle to change its velocity. For instance, the processor may activate a braking mechanism to reduce speed. The amount of velocity reduction may depend on the current velocity of the autonomous vehicle, velocity and predicted trajectory of the vehicle, distance between the autonomous vehicle and the vehicle, and the like. The processor may use a variety of predetermined algorithms to determine when, how, and by what amount to reduce the velocity.

In some embodiments, the processor may direct the autonomous vehicle towards an alternative trajectory away from the predicted trajectory of the vehicle. For instance, the processor may change the autonomous vehicle's lane or may exit its current path (e.g., leave the highway). The processor may identify a plurality of alternative trajectories for the autonomous vehicle. Each alternative trajectory may change the direction of the trajectory for the autonomous vehicle.

In some embodiments, the processor may then determine whether an alternative trajectory is a viable option (e.g., possible to implement without causing more damage to the autonomous vehicle, the vehicle that is predicted to collide with the autonomous vehicle, and/or other traffic objects nearby) to avoid the predicted collision. For instance, the processor may calculate a cost value for different alternative trajectories possible for the autonomous vehicle. The processor may compare the cost values before determining whether an alternative trajectory is justified.

The cost value may be calculated based on various attributes of the vehicle and/or the autonomous vehicle, such as mass, trajectory, predicted trajectory, distance, current velocity, other nearby vehicles, and the like. In an embodiment, the cost value is based on at least one of a mass, volume, density, or material of the vehicles identified to be near the autonomous vehicle. In some embodiments, the autonomous vehicle processor may execute a computer model (e.g., an artificial intelligence model) to calculate and compare cost values for alternative paths.

The calculated cost value may represent estimated quantified damage to the autonomous vehicle and/or estimated damage (e.g., severity of the quantified damage based on a cost function) to a vehicle for the original and each alternative trajectory. That is, the processor may generate a score indicative of possible damage caused if the vehicle continues with the original trajectory and for each alternative trajectory. The processor may use a variety of algorithms to calculate the cost for each trajectory.

After calculating/estimating the cost value for each alternative trajectory, the processor may select a trajectory with the lowest cost value (e.g., indicating the least damage). The processor may then instruct the autonomous vehicle to implement the selected trajectory. For instance, the processor may instruct a vehicle control module, where the control module is configured to apply the selected trajectory having the lowest cost value, and other system inputs used in path planning to identify, evaluate, and modify the autonomous vehicle's trajectory. The vehicle control module may include a steering controller for vehicle lateral motion control, a propulsion and braking controller for vehicle longitudinal motion, and other vehicle controllers.

The processor may continuously use data received via various sensors to determine whether the likelihood of collision has changed. For instance, when the vehicle changes its lane and moves away, the likelihood of collision may no longer satisfy the collision threshold. This indicates that the autonomous vehicle is no longer at risk of collision. As a result, the processor may resume with the original path/trajectory. For instance, the processor may disable the lighting apparatus and sound-generating device previously enabled, and/or resume the velocity that corresponds to the original trajectory.

The methods and systems discussed herein (e.g., method 400) may have many applications, including helping to improve performance of the adaptive cruise control feature with respect to vehicles cutting into or exiting the autonomous vehicle's lane by allowing for some preemptive action.

Additionally or alternatively, the processor may display one or more notifications for the autonomous vehicle and/or any drivers of a vehicle using the method 400 (e.g., a vehicle using adaptive cruise control). For instance, the computer model may predict a time at which the vehicle may enter the lane currently occupied by the autonomous vehicle (e.g., using the slope of the predicted line or the predicted lateral velocity). If the predicted time is less than a threshold (e.g., one second), the processor may transmit the notification.

The method 400 may be used on multiple vehicles simultaneously (or near-simultaneously). For instance, when the processor determines multiple vehicle, the processor may execute the method 400 separately for each identified vehicle. The results may be used for adaptive cruise control. For instance, the autonomous vehicle may execute the methods discussed herein to adapt its trajectory in real-time or near-real-time. Specifically, the processor may use the method 400 to predict an intent for other vehicles (e.g., whether another vehicle is about to move or "cut" into the lane currently occupied by the autonomous vehicle). In this way, the autonomous vehicle can be navigated in a proactive (and not reactive) manner.

FIG. 5 depicts a bird's-eye view of roadway scenario 500 in which an autonomous vehicle 510 can determine an intent of another vehicle. As depicted, the autonomous vehicle 510 may be traveling in the same direction as the target vehicle 520. Specifically, the autonomous vehicle 510 may be traveling in lane 504 and the target vehicle 520 may be traveling in lane 502. Lanes 502 and 504 may be separated by a lane line 534.

As the autonomous vehicle 510 is traveling, the autonomy system may continuously/periodically collect the lateral positions and velocities of all nearby vehicles. For instance, the autonomy system may collect lateral positions 540a-f (collectively referred to herein as lateral positions 540) and a velocity value at each position. Lateral positions 540 may be collected every half-second or using any other selected time frequency.

When the vehicle 520 crosses a predetermined threshold (e.g., depicted as the line 530), the autonomy system may use a method (e.g., method 400) to predict an intent for the vehicle 520. Specifically, the autonomy system may determine whether the vehicle 520 is a certain distance (e.g., distance 532) away from the lane 504 (e.g., lane line 534). When the vehicle 520 is identified to be within the threshold (at position 520a), the autonomy system may retrieve lateral positions and velocities previously monitored (lateral positions 540a-f) and execute the computer model (discussed in method 400) to predict whether the vehicle 520 is going to move into lane 504. As a result, the autonomy system predicts the path 550, which indicates that the vehicle 520 is predicted to have a lateral position indicated by the point 560 (and ultimately, the location 520b). As a result, the autonomy system may either reduce the vehicle 510's velocity or move into lane 502.

FIG. 6 depicts a bird's-eye view of roadway scenario 600, including a schematic representation of an autonomous vehicle 610 and various vehicles surrounding the autonomous vehicle 610. The roadway scenario 600 includes a two-lane roadway with traffic flow in the same direction (autonomous vehicle 610 and the vehicle 620 (at position 620a) are traveling in the same direction). The roadway scenario 600 may also include a bike lane with a cyclist 640.

In the depicted example, the autonomous vehicle 610 contains an autonomy system 612 configured to detect vehicles in a region of collision proximity to the autonomous vehicle 610. Vehicles include various moving vehicles, including the vehicle 620 and the cyclist 640 in the bike lane. Vehicles may also include static objects, including parked vehicle(s), rigid concrete traffic barrier(s), traffic cones (pylons), and the like. During travel of the autonomous vehicle 610, the autonomy system 612 senses the surrounding vehicles. Specifically, the autonomy system 612 senses the vehicle 620. Using various methods discussed herein, the autonomy system 612 predicts that the vehicle 620 is going to change its lateral position in a manner that interferes with (e.g., from position 620a to 620b) a current trajectory of the autonomous vehicle 610.

The autonomy system 612 may periodically monitor the lateral position and velocity of the vehicle 620. Using the retrieved data, the autonomy system 612 determines that the vehicle 620 has a predicted path 630. The predicted path 630 indicates that the vehicle 620 will move into the same lane as the autonomous vehicle 610 (position 620b). As a result, the autonomy system 612 determines that this predicted lane change creates a likelihood of collision that is higher than a certain threshold.

The autonomy system 612 then determines multiple alternative trajectories/paths to avoid the collision with the vehicle 620 or minimize its severity. The autonomous vehicle 610 may identify three potential trajectories 650, 660, and 670. The first alternative trajectory (trajectory 650) may include steering the autonomous vehicle 510 into the bike lane, and the second alternative trajectory (trajectory 660) may include continuing with the same route with a reduced velocity (and enabling the horn while flashing the headlights), and the third alternative trajectory (trajectory 670) may include exiting the current lane to the right.

The autonomy system 612 may also include a cost value for each alternative trajectory. For instance, the alternative trajectory 650 may lead to a probable collision with the cyclist 640 but avoids a collision with the vehicle 620. As a result, the cost value for the alternative trajectory 650 is high. The alternative trajectory 660 includes the same direction as the original route of the autonomous vehicle 610 before the vehicle 620 changed (or was identified as having decided to change) its lane. The alternative trajectory 660 may include a reduction in speed to avoid a potential collision. As a result, the cost value for the alternative path 660 is low because it may avoid a collision with the vehicle 630 and does not involve any other potential collisions. The alternative trajectory 670 would not include a possible collision because the vehicle 620 is predicted to no longer be in its original lane. As a result, the cost value for the alternative path 670 is very low.

The autonomy system 612 may compare the cost values for each alternative trajectory and determine to proceed with the path 670. As a result, the autonomy system 612 reduces the velocity of the autonomous vehicle 610 and instructs the autonomous vehicle 610 to change lanes.

When the autonomous vehicle 610 changes lanes and then passes the vehicle 620, the autonomy system 612 may resume the original trajectory. For instance, the autonomous vehicle may resume its original speed, cease flashing the headlights, and deactivate the horn.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
periodically monitoring, by a processor, lateral position and velocity of a vehicle within a predetermined distance from a lane line representing a boundary of a lane of an autonomous vehicle, the vehicle is moving in a same direction as the autonomous vehicle;
executing, by the processor, a computer model using the monitored lateral position and velocity of the vehicle, to predict a path and a velocity of the vehicle;
determining, by the processor, an intent of the vehicle i) to exit the lane of the autonomous vehicle, or ii) to enter into the lane of the autonomous vehicle, based at least in part on a lateral velocity of the vehicle, wherein the lateral velocity is determined based on the path and the velocity;
determining, by the processor, whether a predicted trajectory for the vehicle has a likelihood of collision with the autonomous vehicle within a time threshold, based on time to collision between the autonomous vehicle and the vehicle determined at least in part based on the path and the velocity of the vehicle;
in response to the vehicle having a threshold distance from the lane line and in response to a current trajectory of the autonomous vehicle having the likelihood of collision with the predicted trajectory of the vehicle satisfying a threshold, determining, by the processor, an alternative trajectory for the autonomous vehicle; and
controlling operation of the autonomous vehicle to travel according to the alternative trajectory.

2. The method of claim 1, wherein the alternative trajectory comprises a reduction in a velocity of the autonomous vehicle.

3. The method of claim 1, wherein the alternative trajectory comprises a lane change.

4. The method of claim 1, wherein the alternative trajectory comprises activating a horn of the autonomous vehicle.

5. The method of claim 1, wherein the alternative trajectory comprises exiting a current path of the autonomous vehicle.

6. The method of claim 1, further comprising:
when the likelihood of collision does not satisfy the threshold, reverting, by the processor, the autonomous vehicle to the current trajectory.

7. The method of claim 1, further comprising:
transmitting, by the processor, a notification indicating that the likelihood of collision satisfies the threshold.

8. The method of claim 1, wherein the vehicle is in an adjacent lane to the autonomous vehicle.

9. A system comprising:
a non-transitory computer-readable storage medium that contains instructions configured to be executed by at least one processor to:
periodically monitor lateral position and velocity of a vehicle within a predetermined distance from a lane line representing a boundary of a lane of an autonomous vehicle, the vehicle is moving in a same direction as the autonomous vehicle;
execute a computer model using the monitored lateral position and velocity of the vehicle, to predict a path and a velocity of the vehicle;
determine, by the at least one processor, an intent of the vehicle i) to exit the lane of the autonomous vehicle, or ii) to enter into the lane of the autonomous vehicle, based at least in part on a lateral velocity of the vehicle, wherein the lateral velocity is determined based on the path and the velocity;
determine, by the at least one processor, whether a predicted trajectory for the vehicle has a likelihood of collision with the autonomous vehicle within a time threshold, based on time to collision between the autonomous vehicle and the vehicle determined at least in part based on the path and the velocity of the vehicle;
in response to the vehicle having a threshold distance from the lane line and in response to a current trajectory of the autonomous vehicle having the likelihood of collision with the predicted trajectory of the vehicle satisfying a threshold, determine an alternative trajectory for the autonomous vehicle; and
control operation of the autonomous vehicle to travel according to the alternative trajectory.

10. The system of claim 9, wherein the alternative trajectory comprises a reduction in a velocity of the autonomous vehicle.

11. The system of claim 9, wherein the alternative trajectory comprises a lane change.

12. The system of claim 9, wherein the alternative trajectory comprises activating a horn of the autonomous vehicle.

13. The system of claim 9, wherein the alternative trajectory comprises exiting a current path of the autonomous vehicle.

14. The system of claim 9, wherein the at least one processor is further configured to:
when the likelihood of collision does not satisfy the threshold, revert the autonomous vehicle to the current trajectory.

15. The system of claim 9, wherein the at least one processor is further configured to:
transmit a notification indicating that the likelihood of collision satisfies the threshold.

16. The system of claim 9, wherein the vehicle is in an adjacent lane to the autonomous vehicle.

* * * * *